Sept. 30, 1958

P. J. H. JANSSEN

SYNCHRONIZING-PULSE-GATED AUTOMATIC GAIN CONTROL FOR TELEVISION RECEIVER

Filed Dec. 17, 1956

2,854,571

INVENTOR
PETER JOHANNES HUBERTUS JANSSEN

BY Frank R. Jifari
AGENT 2,854,571

SYNCHRONIZING-PULSE-GATED AUTOMATIC GAIN CONTROL FOR TELEVISION RECEIVER

Peter Johannes Hubertus Janssen, Eindhoven, Netherlands, assignor, by mesne assignments, to North American Philips Company, Inc., New York, N. Y., a corporation of Delaware Application December 17, 1956, Serial No. 628,743

Claims priority, application Netherlands January 27, 1956

3 Claims. (Cl. 250—20)

The invention relates to a circuit arrangement for producing a control voltage for automatic gain control in a television receiver, in which the demodulated television signal containing negative going synchronizing pulses is supplied to the control grid of a tube and the voltage set up across the cathode resistor of this tube is supplied to the cathode of a second tube which becomes conductive under the control of pulses which are periodically supplied to the anode circuit of said second tube.

In such a known circuit arrangement the control grid of the second tube is connected to earth. The anode voltage of this tube is positive only during the occurrence of the positive going pulses which are periodically supplied to the anode. With correct operation of the circuit arrangement, these positive pulses at the anode coincide with the positive going synchronizing pulses in the control grid circuit of this tube, the combination of pulses rendering this tube conductive so that across a resistor connected in the anode circuit of this second tube a control voltage is set up which is used for automatic gain control of the television receiver.

When there is no coincidence between the said two pulse trains, the second tube substantially does not become conductive so that in the output circuit of this second tube substantially no control voltage of negative polarity is produced with a resultant maximum amplification in the television receiver. If, now, strong input signals are received, there may be heavy over-loading in the receiver.

The circuit arrangement in accordance with the invention obviates this disadvantage and is characterized in that from the voltage appearing at the cathode of the second tube a direct voltage is derived, which is applied between the cathode and the control grid of this second tube.

In order that the invention may readily be carried out, one embodiment thereof will now be described, by way of example, with reference to the accompanying diagrammatic drawing.

Figure 1:
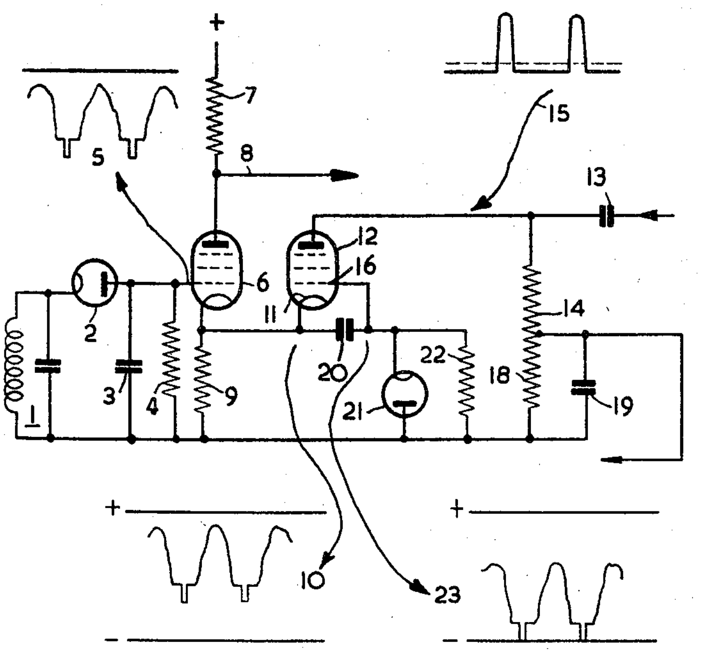
Figure 2:
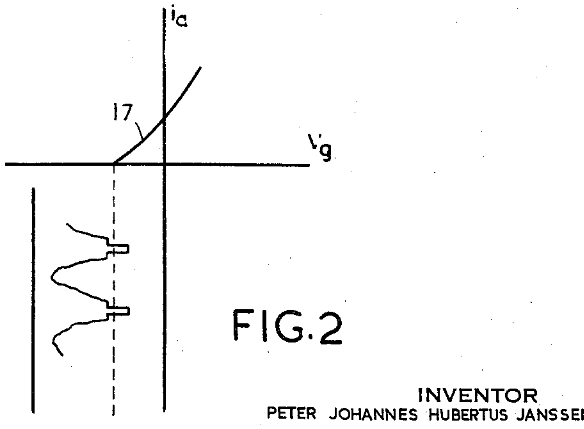

In the drawings, Figure 1 illustrates a preferred embodiment of the circuit of this invention while Figure 2 illustrates its mode of operation.

In Fig. 1, the signal set up across the intermediate frequency circuit 1 is supplied to the detector circuit which comprises a rectifier 2 and the parallel combination of a capacitor 3 and a resistor 4. With a television signal modulating a carrier wave in the negative sense and with the shown polarity of the diode 2, across the resistor 4 a detected signal is produced the synchronizing pulses of which are negative going from a fixed level, as is shown diagrammatically at 5.

The signal produced across the resistor 4 is supplied to the control grid circuit of the tube 6. The anode circuit of the tube 6 includes a resistor 7 from which at 8 a signal is taken which is supplied in known manner inter alia to the cathode-ray tube.

In the cathode circuit of the tube 6 a resistor 9 is connected across which a signal is produced of the kind shown in Fig. 1 at 10, having the same polarity as the signal supplied to the control grid. The cathode of the tube 6 is directly connected to the cathode 11 of a second tube 12. To the anode of the tube 12 there are periodically supplied in known manner through a capacitor 13 and a resistor 14 positive-going voltage pulses of the shape shown by 15, which can be derived from the line deflection circuit and should appear simultaneously with the synchronizing pulses of the signal 10 at the cathode of the tube 12. If, now, the control grid of the tube 12 is connected to earth, as is the case in a known circuit arrangement, a signal is produced in the control grid circuit of the shape shown in Fig. 2. The anode current-grid voltage characteristic 17 applies to the time during which the tube 12 is conductive owing to the positive voltage pulses appearing at the anode of this tube. If the latter pulses coincide with the synchronizing pulses at the control electrode of the tube 12, this tube becomes conductive. With increasing amplitude of the signal 5, the voltage in the control grid circuit of the tube 12 increases during the occurrence of the synchronizing pulses, and the anode current of the tube 12 flowing through the resistor 14 is increased so that the voltage across the part 18 of the resistor 14 becomes more negative. A capacitor is connected in parallel with the resistor 18. From this parallel combination 18, 19 the control voltage for automatic gain control can be derived in known manner.

If, now, for any reason the positive pulses of the signal 5 do not coincide with the synchronizing pulses of the signal 10, the tube 12 will not be conductive at all, as will be seen from Fig. 2, since the tube 12 is cut off except for the duration of the synchronizing pulses. Consequently no negative control voltage will be set up across the parallel combination 18, 19 and this may give rise to heavy overloading, as has been mentioned hereinbefore.

For the sake of completeness it should be noted that owing to the initial absence of a control voltage, the signal 5 can increase in amplitude to an extent such that part of the image signals falls within the pass range of the tube 12 (see Fig. 2), so that integrated with respect to time a certain, though smaller, control voltage is nevertheless produced. However, even in this event the increase of the signal 5 may be such that the synchronizing pulses fall below the cut-off point of the tube 6, so that the output signal of the said circuit does no longer contain any information with respect to the synchronization. It will be evident that as a result the receiver cannot operate satisfactorily.

The invention obviates this disadvantage in that instead of a fixed earth potential a direct voltage with respect to the cathode is applied to the control grid 16 of the tube 12. This is achieved in that the control grid is connected, through a capacitor 20, to the cathode 11 and also, through the parallel combination of a diode 21 and a resistor 22, to earth, the cathode of the diode 21 being connected to the control grid 16. If, now, a signal of the shape shown at 10 appears at the cathode 11, a signal of the shape shown at 23 is set up at the control grid 16. During the peaks of the synchronizing pulses the control grid 16 is again substantially at earth potential so that the situation is the same as in the known circuit arrangement. When there are no synchronizing pulses, however, the control grid is now positive, that is to say less negative with respect to the cathode 11. Consequently, the tube 12 is also conductive if, owing to non-coincidence, the positive pulses of the signal 15 appear at the anode 12 at other instants than the synchronizing pulses at the control electrode of the tube 12. Thus, in this event also, a negative control voltage is produced across the parallel combination 18, 19 so that overloading in the receiver is avoided. It has been found in practice that the time constant of 20, 22 should preferably have a value of from 2 to 20 line periods.

The larger the amplitude of the signal 5 and consequently of the signal 10, the smaller is the potential difference between the control grid and the cathode of the tube 12 and consequently the larger is the produced negative control voltage.

What is claimed is:

1. A television receiver circuit for generating an automatic gain control voltage, comprising a source of a television signal having negative-going synchronizing pulses, a first electronic tube having a control grid and a cathode, means connected to apply said signal to said control grid, a load resistor connected at an end thereof to said cathode, a second electronic tube having a control grid, a cathode and an anode, means connecting together the cathodes of said first and second tubes, a source of positive-going periodic pulses connected to said anode, means connected to said anode to derive said automatic gain control voltage therefrom, biasing means connected to said load resistor for deriving a direct voltage from the signal appearing therein, and means connected to apply said direct voltage between the cathode and control grid of said second tube.

2. A circuit as claimed in claim 1, in which said biasing means comprises a capacitor connected between the cathode and control grid of said second tube, a rectifier having a cathode connected to said control grid of the second tube and having an anode connected to the other end of said load resistor, and a resistor connected between the cathode and anode of said rectifier.

3. A circuit for generating a control voltage, comprising a source of a signal having periodic negative-going pulses, an electronic amplifier device having a cathode, a control grid and an anode, means connected to apply said signal to said cathode, a source of positive-going periodic pulses connected to said anode, means connected to said anode to derive said control voltage therefrom, biasing means connected to said cathode for deriving a direct voltage from said signal, and means connected to apply said direct voltage between said cathode and said control grid.

References Cited in the file of this patent

UNITED STATES PATENTS 2,786,902 Walter -------------- Mar. 26, 1957

FOREIGN PATENTS 517,826 Belgium --------------- Jan. 21, 1955